(12) United States Patent
Calado Da Silva et al.

(10) Patent No.: US 9,249,020 B2
(45) Date of Patent: Feb. 2, 2016

(54) NANOCRYSTALINE SPHERICAL CERAMIC OXIDES, PROCESS FOR THE SYNTHESIS AND USE THEREOF

(75) Inventors: João Manuel Calado Da Silva, Aljustrel (PT); Elsa Marisa Dos Santos Antunes, Aljustrel (PT)

(73) Assignee: CUF-COMPANHIA UNIAO FABRIL, SGPS, S.A., Alverca do Ribatejo (PT)

( * ) Notice: Subject to any disclaimer, the term of this patent is extended or adjusted under 35 U.S.C. 154(b) by 484 days.

(21) Appl. No.: 12/680,486

(22) PCT Filed: Sep. 26, 2008

(86) PCT No.: PCT/IB2008/053932
§ 371 (c)(1),
(2), (4) Date: Oct. 29, 2010

(87) PCT Pub. No.: WO2009/040770
PCT Pub. Date: Apr. 2, 2009

(65) Prior Publication Data
US 2011/0039103 A1  Feb. 17, 2011

(30) Foreign Application Priority Data
Sep. 28, 2007  (PT) ......................... 103838

(51) Int. Cl.
| | |
|---|---|
| C01B 13/00 | (2006.01) |
| C01B 13/32 | (2006.01) |
| C01B 13/18 | (2006.01) |
| C01G 23/04 | (2006.01) |
| C01G 3/02 | (2006.01) |
| C01F 5/02 | (2006.01) |
| C01F 5/04 | (2006.01) |
| C01B 33/12 | (2006.01) |
| C01B 33/18 | (2006.01) |
| C01F 7/02 | (2006.01) |
| C01F 7/42 | (2006.01) |
| C01G 9/02 | (2006.01) |
| C01G 23/047 | (2006.01) |
| C01G 25/02 | (2006.01) |
| C01G 45/02 | (2006.01) |
| C01G 53/04 | (2006.01) |

(52) U.S. Cl.
CPC ............... *C01B 13/328* (2013.01); *C01B 13/18* (2013.01); *C01B 13/185* (2013.01); *C01B 33/12* (2013.01); *C01B 33/18* (2013.01); *C01F 5/02* (2013.01); *C01F 5/04* (2013.01); *C01F 7/02* (2013.01); *C01F 7/42* (2013.01); *C01G 3/02* (2013.01); *C01G 9/02* (2013.01); *C01G 23/04* (2013.01); *C01G 23/047* (2013.01); *C01G 25/02* (2013.01); *C01G 45/02* (2013.01); *C01G 53/04* (2013.01); *C01P 2002/60* (2013.01); *C01P 2004/32* (2013.01); *C01P 2004/53* (2013.01); *C01P 2004/61* (2013.01); *C01P 2006/32* (2013.01); *C01P 2006/80* (2013.01); *Y10T 428/2982* (2015.01)

(58) Field of Classification Search
USPC ................. 423/592.1–594.19; 501/102–139; 977/776, 811
See application file for complete search history.

(56) References Cited

U.S. PATENT DOCUMENTS

| | | | | |
|---|---|---|---|---|
| 5,762,894 A * | 6/1998 | Takatori et al. | ............... | 423/263 |
| 5,855,827 A | 1/1999 | Bussing et al. | | |
| 5,984,997 A * | 11/1999 | Bickmore et al. | ............... | 75/343 |
| 6,221,805 B1 * | 4/2001 | Yamashita et al. | ............. | 502/332 |
| 2002/0160912 A1 * | 10/2002 | Morikawa et al. | ............. | 502/303 |
| 2004/0180203 A1 * | 9/2004 | Yadav et al. | .................. | 428/402 |

FOREIGN PATENT DOCUMENTS

EP  1 577 265 A1  9/2005

OTHER PUBLICATIONS

Xinghua Xie et al.; "Detonation synthesis of zinc oxide nanometer powders"; Material Letters; North Holland Publishing Company; Amsterdam; NL; vol. 60, No. 25-26 (Nov. 1, 2006), pp. 3149-3152.
X. H. Wang et al.; "Research of Thermal Decomposition Kinetic Characteristics of Emulsion Explosive Base Containing Fe and Mn Elements"; Journal of Thermal Analysis and Calorimetry, Kluwer Academic Publishers; vol. 91, No. 2 (Sep. 24, 2007), pp. 545-550.
Xiao Hong Wang et al.; "Nano-MnFe2O4 Powder Synthesis by Detonation of Emulsion Explosive"; Applied Physics A; Material Science & Processing; Springer; Berlin; vol. 90, No. 3 (Nov. 6, 2007), pp. 417-422.
International Search Report for PCT/IB2008/053932 dated on May 8, 2009.

* cited by examiner

*Primary Examiner* — Steven Bos
(74) *Attorney, Agent, or Firm* — John P. White; Cooper & Dunham LLP

(57) ABSTRACT

The present invention refers to nanocrystalline spherical ceramic oxides, to the process for the synthesis and use thereof. These oxides, obtained by detonation of a water-in-oil emulsion (W/O), besides having a spherical morphology and nanocrystallinity, show a set of complementary features, namely a particle dimension inferior to 40 μm, bimodal particle size distribution, high purity, deagglomeration and stable crystalline stages. This set of features makes these powders particularly suitable for several applications such as coating processes, near net shape processes and, when applied in ceramics industry, they provide dense and porous ceramic objects of exceptionally high mechanical resistance.

6 Claims, No Drawings

NANOCRYSTALINE SPHERICAL CERAMIC OXIDES, PROCESS FOR THE SYNTHESIS AND USE THEREOF

This application is a U.S. national phase filing under 35 U.S.C. §371 of PCT Application No. PCT/IB2008/053932, filed Sep. 26, 2008, and claims priority thereto under 35 U.S.C. §119 to Portuguese patent application no. 103838, filed Sep. 28, 2007, the entireties of both of which are incorporated by reference herein.

TECHNICAL DOMAIN OF THE INVENTION

The present invention relates to a process for obtaining nanocrystalline spherical ceramic oxide powders, suitable for the high technology ceramics field.

STATE OF THE ART

The fast development in the high technology ceramics field, with new and promising applications in vast areas, has given rise to not only different shaping and sintering processes but also methods and techniques for obtaining powders with new functionalities.

In general, literature has made reference to the fact that the ideal properties of the powders for the production of high performance ceramic objects should obey the following set of requirements: morphology, particle dimension, particle size distribution, purity, agglomeration state, crystallographic phases, crystallite dimension and internal structure of the particles.

1. Morphology

The sphericity of the particles is associated with the packing degree of the powders, which is very high when the particle is spherical, providing excellent drainage ability, higher precision in final dimensions and better mechanical resistance of the objects.

2. Particle Size: 0.1 to 10 Microns

Particles with smaller dimensions show a better reactivity, allowing temperatures and lower sintering times, soon elevating the profitability of the process.

3. Size Distribution Type

The bimodal distribution improves the packing degree of the particles, which translates into higher green density values, and consequently benefits the densification stage.

4. Purity

High purity is a fundamental requirement in ceramic powders, since small percentages of contaminants may strongly affect the mechanical, electrical, optical and magnetic properties.

5. Agglomeration State

The agglomerated powders increase the internal porosity which is extremely difficult to eliminate during the sintering stage.

6. Crystallographic Phases

If the powder crystalline phases are not stable, volume variations might occur during the sintering process due to the phase transformations, thus originating defects in the final object.

7. Crystallite Size

The crystallite dimension strongly influences the mechanical, optical, electrical and magnetic properties. The smaller the size of the crystal is, the higher the mechanical resistance of the object will be.

8. Particle Internal Structure

The internal porosity in the particles is very difficult to eliminate during the sintering process, the final objects showing lower densities and mechanical properties.

Sphericity

The particle spherical morphology is a quite important requirement in a ceramic powder, due to a vast set of reasons:

During the object's shaping process, it allows achieving high packing densities (60% of the real particle density);

Due to a highly regular shape of the particles, the powders show excellent drainage features which are very important for their use in near net processes, namely in injection molding (CIM—Ceramic Injection Molding) and in slip casting;

The regular shape of the particles (due to its morphology) allows a regular grain growth during the sintering process, leading to homogeneous shrinkage in the several dimensions, such having consequences in the mould conception and in the tolerances obtained in the final objects;

On the other hand, when starting from spherical particles, after the sintering process, one can obtain pores similarly spherical that provide the final ceramic objects with a higher mechanical resistance.

Due to the fact that the melting point of the major oxides is superior to 2000° C., dense spherical particles are mainly accessible by a small number of methods (table 1), once such sphericity implies a synthesis at temperatures higher than the melting point.

TABLE 1

Methods for the synthesis of spherical oxides

| Method | Difficulty in the synthesis of powders |
|---|---|
| Melting and resolidifying ceramic powders in gaseous plasma | Very low energetic efficiency |
| Powder agglomeration and spray drying | High particle sizes (superior to 30 microns) |
| Methods for emulsion or solution combustion | Obtaining of hollow spheres |

Due to an easy and price effective ability in reaching temperatures above 2000° C. the process disclosed in the present invention allows obtaining, with high energy efficiency, dense powders with a spherical morphology, thus surpassing the difficulties of the methods referred to in the state of the art.

Crystallite Dimension

The size of the crystals (grains) in the ceramic final object will lastly determine the whole set of mechanical, optical, electrical and magnetic properties. This final dimension depends not only on the initial size of the crystallites in the powder, but also on the growth that will take place during the sintering cycle.

In most known methods, the oxide powders are obtained from the conversion of the hydroxides of the respective metal, by means of a thermal treatment stage (calcination). For instance, in the Bayer process anhydrous alumina particles are converted into aluminium oxide inside rotational calcinating ovens. The slow thermal treatment at high temperatures leads to an evident growth of the crystallite, being difficult to obtain crystals inferior to 0.5 microns. In the method disclosed in the present invention, due to the high cooling rate, the ceramic powder crystals are of nanometric dimension, in other words, inferior to 100 nanometers.

The ceramic oxide powders obtained by the method of the present invention thus associate two extremely important features: the sphericity and the nanocrystallinity with high energetic efficiency.

In addition to the sphericity and nanocrystallinity features, the method also allows achieving other features previously mentioned, namely particle size inferior to 40 microns, bimodal particle size distribution, high purity, particles totally deagglomerated and of dense structure.

The synthesis of spherical powders of nanocrystalline ceramic oxides at high temperatures and pressures starting from the detonation of a water-in-oil emulsion (W/O), such as extolled in the present invention, allows obtaining dense and porous ceramic objects of highly mechanical resistance.

Furthermore, the excellent drainage ability of the powders makes them particularly suitable for near net processes namely the injection moulding, slip casting and covering processes.

The detonation is a significantly fast adiabatic reaction and it is characterized in that it occurs simultaneously at high temperatures (about 3000° C.) and pressures (50 Kbar). So being, according to the features of the chemical elements, one assumes that a vast range of metals reacts with oxygen in the gaseous phase and the remaining metals react in the liquid phase. Therefore, there is one moment in the reaction in which the products formed (ceramic oxides) are in the liquid phase and only later turn into to the solid phase.

The oxide synthesis by means of the detonation process occurs as well as an alternative process with excellent potentialities, once high temperatures are achieved in a cost effective manner. The fact that all products (ceramic oxides) are synthesized in the liquid phase, leads to obtaining spherical powders. The high pressures achieved during the reaction enrich the formation of denser crystalline phases.

The powders synthesized by detonation still show mechanical, optical, magnetic, thermal and electrical properties different from the normal ones, due to the simultaneous combination of high pressures and temperatures during this synthesis process.

The use of the detonation process in the synthesis of materials with special properties is referred to in a set of patent documents and publications, namely:

U.S. Pat. No. 5,855,827 describes a cyclic process for the production of ceramic coatings in different substrates. The detonation occurs in a gaseous mixture comprising a metal suspension of extremely thin granulometry. The process of the present invention stands out for the use of a W/O emulsion in liquid or solid phase, enabling a better control of the oxide synthesis conditions.

EP 1577265 discloses an industrial process for the production of fine aluminium powder, from a cyclic process of detonation of mixed granulated aluminium with an oxidant agent. The present invention stands out for incorporating several types of metallic precursors (such as, although not limited to: metals, nitrates, sulphates, acetates) and for controlling the final properties of the synthesized oxides namely, the sphericity and nanocrystallinity.

The document Fenglei H., Yi T., Shourong Y., "Synthesis Mechanism and Technology of ultrafine diamond from detonation"—*Physics of the Solid State*, MAIK Nauka/Interperiodica ISSN 1063-7834 (Form) 1090-6460 (Online) Vol. 46, no. 4, April 2004, p. 616-619, discloses obtaining nanometric diamond powders from the detonation of carbon-rich. The present invention stands out for using a W/O metal-rich emulsion or salts thereof for the production of oxides with sphericity and nanocrystallinity features.

The document Chiganova, G. A., "Detonation synthesis of ultrafine alumina"—*Inorganic Materials*", MAIK Nauka/Interperiodica ISSN 0020-1685 (Form) 1608-3172 (Online) Vol. 41 no. 5, May 2005, p. 468-475, discloses the use of the energy from the explosion to accelerate and oxidize aluminium in very fine boards, within a chamber with oxygen, thus producing nanometric alumina. In the present invention, the metal oxidation occurs mainly by detonation, whereas in this document the reaction of the aluminium occurs later, in a gaseous chamber, thus obtaining alumina with crystalline transition phases (unstable).

The detonation is further referred to in a set of documents as a phase transformation method or still as a compaction/densification method for ceramic powders that takes place after the shock wave, wherein 100% densifications are obtained and depending on the speed of the process the growth of the grain is minimal. It must be pointed out that, in this case, the detonation is an alternative method to the conventional sintering processes and in the present invention the detonation is a method for the synthesis of ceramic powders.

NL 1014199 discloses powder fractions (2) which are added to an internal cylinder (1) inside an external cylinder (3), the space between the two cylinders being filled with explosive material (4), which is detonated such as to compress the powder fractions. A method for the dynamic shock or compression by means of compaction of metallic, ceramic or polymeric powder fractions comprises adding the fractions or their combinations in specific mixture ratios and subsequent distribution in a first vertical cylinder (internal). The later is afterwards placed on the basis of a second vertical cylinder (external) containing a larger diameter and height, the space among the two cylinders being filled with explosive material before adding a detonator (9), across the centre of the upper end of the second cylinder. The detonation of the explosive material generates a shock wave that passes through the powder fractions. The explosive quantity and type are selected to create a high impact compression of the powder fractions. The present invention stands out for using the detonation as synthesis method for ceramic oxides.

GENERAL DESCRIPTION OF THE INVENTION

The present invention consists of a process for the synthesis of ceramic oxides by detonation of a water-in-oil emulsion (W/O), being characteristic for possessing a spherical morphology and for presenting a nanocrystalline nature (crystallite dimension inferior to 100 nanometers), and which further combines the following set of features:

a) particle size inferior to 40 microns,
b) bimodal particle size distribution;
c) High purity—higher than 99.5%;
d) Different crystalline phases;
e) deagglomerated particles.

In addition to the set of characteristics already mentioned, the fact that the particles are formed from a coalescence mechanism, at significantly high temperatures and pressures, developed by the detonation process, provides an exceedingly high mechanical resistance to the powders individually, and to the ceramic objects or matrixes where the powders are incorporated as reinforcement agents.

The process for the synthesis of nanocrystalline ceramic oxide powders of the present invention consists essentially of detonating an emulsion, with the subsequent synthesis of the referred ceramic oxides as detonation reaction products.

The said base emulsion of the present invention is of the (W/O) type, broadly used in the explosive emulsion manufacture, being composed by two phases intimately linked under a surfactant effect:
- a) internal phase (based on ammonium nitrate, aqueous and oxygen-rich)
- b) external phase (based on organic compounds)

One of the essential aspects for this process is the incorporation in the said base emulsion of metals in its composition, such as Al, Ti, Si, Mg, etc., with different forms and geometries namely fine powder, granules, films, mixed and homogenized squares. The emulsion composition can still be complemented by means of dissolving metallic salts in the oxidant phase, such as, although not limited to, nitrates, sulphates, chlorides, acetates, of the corresponding metals, such as magnesium nitrate, titanium chloride and Zirconium sulphate, such as to adjust the detonation temperature.

During the emulsion detonation process, the respective oxides are formed from the reaction between the metallic element (M) and oxygen (O).

Despite not existing an absolute agreement on this matter, one admits that the mechanism for the formation of oxides takes place by means of a globally exothermal reaction generally according to the following kinetics:

$$M(s) \rightarrow M(l) \qquad 1$$

$$M(l) \rightarrow M(g) \qquad 2$$

$$M(g) + O(g) \rightarrow MO(g) \qquad 3$$

$$MO(g) \rightarrow MO(l) \qquad 4$$

$$MO(l) \rightarrow MO(s) \qquad 5$$

wherein (s) represents the solid state, (g) represents the gaseous state and (l) represents the liquid state.

Stages (1 to 5) occur in three different phases from the detonation reaction:
- a) Stages 1 and 2
  Occur in the phase designated as Van Newman Peak, which corresponds to the maximum compression originated by the shock wave, causing the heating of the metal and its consequent transformation from solid to liquid phase (stage 1) and subsequently to gaseous phase (stage 2).
- b) Stage 3
  Occurs in the phase designated as reaction zone, which corresponds to the zone preceding and sustaining the passage of the shock wave ending in point C, J (Chapman, Jouget) in the case of ideal detonations.
- c) Stages 4 and 5
  Occur in the phase designated as Taylor zone, which corresponds to the adiabatic expansion of the gases resulting from the reaction.

The water-in-oil emulsion (W/O) is particularly suited for the process for powder synthesis by detonation, for three reasons:
1. Due to the high homogeneity grade between oxidant and fuel phases, it has the necessary structure to assure complete chemical reactions during detonation.
2. It presents a high flexibility in terms of the possibility of adding the different metallic precursors (solubilising in the oxidant solution, incorporating in the fuel phase) thus allowing a strict control of the purity and other properties of the synthesized powders.
3. It is a stable explosive emulsion, very safe and insensitive against shock and friction, due to the high water content of its composition.

Generally, the emulsion composition must guarantee an enthalpy of exothermic global reaction, otherwise, the detonation reaction will not take place in a stable and reproducible manner.

The incorporation of metals in the emulsion composition results in major deliverance of energy and high end temperatures resulting from the exothermic character of the metal oxidation reaction. On the other hand, the integration of endothermic elements in the emulsion composition, such as water, metallic salts (such as, although not limited to, nitrates, sulphates), implies a reduction of the explosion heat and end temperature of the gases.

The most important factor for obtaining particles of spherical morphology is the reaction temperature. Obtaining spherical particles by detonation requests that the temperature in the reaction zone, that is, in point C, J (Chapman, Jouget) is superior to the oxide melting point, allowing these to remain in the liquid state in the respective phase diagram (P, T) and consequently obtain the spherical form by means of a coalescence process.

Table 2 shows the temperatures in point C, J, calculated by simulation for the composition of an oxidant matrix comprising 30% metal, and the melting temperatures of the respective oxides to 1 atmosphere pressure. It must be noted that this melting temperature rises, however, with the pressure (according to Clapeyron ratio), but substantially decreases on the other hand with the reduction of the particle size, namely below 50 nanometers.

TABLE 2

Temperatures in point C, J, calculated by simulation for the composition of an oxidant matrix comprising 30% metal, and the melting temperatures of the respective oxides to 1 atmosphere pressure.

| Composition | Temperature in point C, J (° C.) | Oxide melting temperature at P = 1 atm (° C.) |
|---|---|---|
| Matrix (70) + Al(30) | 4294 | 2072 |
| Matrix (70) + Si(30) | 4176 | 1410 |
| Matrix (70) + Mg(30) | 4034 | 2852 |
| Matrix (70) + Ti(30) | 3465 | 1830 |
| Matrix (70) + Zr(30) | 3450 | 2700 |
| Matrix (70) + Zn(30) | 3422 | 1975 |
| Matrix (70) + Fe(30) | 2199 | 1538 |

In the majority of cases one observes that the reaction temperatures comprising 30% metal are clearly higher than the melting temperature of the respective oxides.

Through the emulsion composition it is possible to control the temperature in point C, J and consequently the final shape of the particles. It is worth mentioning that an extremely fast expansion of hot gases, wherein particle growth occurs through a coalescence mechanism, is considered as an adiabatic process (that is, without heat exchange with the exterior), wherein the detonation gives rise to a high energy efficiency.

The crystallite size is basically defined in the Taylor zone (gas expansion), wherein the highest the cooling rate of the oxide particles becomes, the smaller the particles will become. It is worth mentioning that the size of the final crystallite is the feature that most influences the mechanical resistance of the oxide powders or ceramic objects that incorporate the same.

From this point of view, the process for powder synthesis by detonation is ideal because the cooling rate can be very fast, allowing to obtain nanometric crystals. Since the powders are synthesized at temperatures higher than the sintering temperature, the crystallite growth rate during the sintering cycle is smaller. The combination of these two motifs leads to obtaining very small crystals, with some dozens of nanometers in the final ceramic objects, and consequently to the presence of high mechanical resistance values both in the porous and dense ceramic objects.

The final dimension of the particles, fundamentally depends on the coalescence time which is proportional to the difference between the reaction temperature in point C, J and the melting temperature of the oxide (it is considered that when the melting temperature is achieved, the particle solidifies and its growth ceases) meaning that by regulating the reaction temperature it is possible to control the final size of the particles.

For a certain type of emulsion geometry, such as a cylinder, it is ascertained that during the radial expansion process, the peripheral particles have smaller collision numbers and they grow less. So being, the smaller the thickness of the initial cylinder is, the larger the ratio (superficial/volume) and consequently narrower and more homogeneous the obtained distribution will be.

The phases, such as the crystallite size, are defined in the gas expansion zone, the most stable phases being obtained when the temperature is maintained high for a longer period of time. It must be referred that besides temperature, the high pressures reached during detonation tend to favour the formation of denser crystalline phases. One should point out, that the phase diagrams in this process take three variables into consideration: pressure, temperature and composition. However, nowadays still no phase diagrams are known with pressure influence, once the usual chemical processes do not normally conjugate simultaneous high pressures and temperature.

The purity grade obtained in the oxide depends mainly on the primary contaminants within the raw materials present in the emulsion composition, once the only solid product formed is the oxide itself, the remaining ones being gaseous.

There are a set of applications wherein one of the requirements is the hydrophobic character of the oxide, such that it may be compatible with the mean (liquid, suspension, matrix, etc.) in which it is applied. In these cases, it is usually necessary to provide a previous covering in order to obtain such feature.

During detonation and due to its larger reactivity the metals win the race for oxygen, the oxide being the first compound to be formed. So being, by controlling the balance of oxygen in the emulsion, it is possible to foresee the formation of a carbon covering, in other words, if the initial composition comprises mainly the necessary oxygen for the stoichiometric reaction with the metal, the whole percentage of carbon present in that composition will not have the possibility to combine with the oxygen and as such, it will be present as a covering of the formed oxide. The higher or lowest covering grade is the main task of the balance of global oxygen of the initial composition.

Therefore, the explosive emulsion, besides comprising a composition in water, nitrates and the external phase as previously mentioned, should still contain a balance of negative oxygen between 0 and 400 g/kg, in order to allow obtaining an hydrophobic covering in the synthesized powders, which is ensured by the inclusion of an external hydrocarbon-rich phase from 2 to 30%.

The method of powder synthesis described in the present invention stands out from the known processes for cost effective reasons, it is a process of high energy efficiency once the detonation is an adiabatic reaction (exempt from heat exchange with the exterior). On the other hand, in conventional processes of chemical industry it is difficult to simultaneously combine high pressures and temperatures, which have influence over the mechanical, optical, magnetic, thermal and electrical properties of the formed oxides.

The powders synthesized by detonation have the particular feature of combining properties that are usually extremely difficult to obtain simultaneously in other processes. The spherical morphology is one of the powder features that is accessible by few methods, essentially for cost effective reasons and, in other cases, hollow spheres are obtained, which are not desirable for most applications. In known processes, stable crystalline phases are obtained subjecting the powders to thermal treatment, usually carried out at high temperatures, whose larger disadvantage is the increase of the crystallite size.

The powders obtained by detonation of W/O emulsion display a set of properties that makes them particularly suitable for near net shape processes namely, in injection moulding, slip casting and covering.

These oxides are naturally synthesized at temperatures and pressures simultaneously high, thus allowing to obtain dense and porous ceramic objects of extremely high mechanical resistance when applied to ceramics industry.

DETAILED DESCRIPTION OF THE INVENTION

Generally, the process for obtaining ceramic oxides from the detonation of a water-in-oil emulsion (W/O) takes place in two stages:

1. Obtaining the W/O Emulsion

The emulsion is produced according to the following stages:

1.1—Preparing the oxidant solution: dissolution in water of the ammonium nitrate and metallic precursors, according to the desired composition. These metallic precursors can be selected from nitrates, sulphates, acetates, etc. The amount of water should be from 3 to 50% and the ammonium nitrate and metallic precursor from 2 to 90%.

1.2—Preparing the fuel mixture: homogenization of the hydrocarbon from 50 to 95%, with the respective surfactant from 5 to 50%.

1.3—Emulsification: Homogenization of oxidant (values from 70 to 98%) and fuel phases (from 2 to 30%) in an emulsifier in the temperature interval from 70 to 110° C., a stable emulsion being obtained.

1.4—Adding a sensitizing agent: formation of an homogeneous mixture (sensitizing emulsion) consisting of two essential elements: the emulsion, obtained in stage 3, and the sensitizing agent required to obtain a stable detonation.

1.5—Adding metal at the desired percentage. This addition and respective homogenization take place in a tank under stirring.

2—Packing the Emulsion

The emulsion formed in stages 1 to 5 is subsequently packed in a cylindrical geometry in an appropriate packing device.

3—Detonating the W/O Emulsion

The emulsion cartridge is placed in a detonation chamber, and subsequently actuated by an electrical detonator by collecting the formed oxides.

4—Collecting the Oxide Powders

The powders are later collected in a deposit that is coupled to the respective detonation chamber.

After having been collected, the powders obtained according to the process described above, are subject to several types of analysis for characterization purposes:

a) X-Ray Diffraction

The X-Ray diffraction allows identifying the material, its crystalline phases and crystallite size. The value of the crystallite dimension is determined by means of Scherrer equation and with the width values half way from the most intense peak in the X-Ray diffractogram.

b) Particle Size Distribution

The particle size distribution is determined in a granulometric measuring device starting from a suspension consisting of the powder, water and 1 mL dispersant which is chemically compatible with the powder that is intended to analyze. By means of the graph obtained, the distribution type (monomodal, bimodal or multimodal) of the respective powder is determined.

c)—Determination of Powder Morphology

A small quantity of powder is placed over a grid carbon support that is in its turn glued to an adequate support of the Scanning Electron Microscopy—SEM to be used, and finally the powder is covered with a carbon nanometric layer of carbon. Continuously, morphology, texture, as well as the agglomeration state of the powder are observed in the SEM. It must be mentioned that this analysis is mainly qualitative.

TABLE 3

Characteristics of the powders obtained according to the conditions in examples 1 and 2.

| Ceramic oxide | Particle medium size | Morphology | Crystallite dimension | Crystalline phases |
|---|---|---|---|---|
| Alumina | 6.5 | Spherical | 60 | Alpha |
| Titania | 3.9 | Spherical | 40 | Rutile |

EXAMPLES

Example 1

An Homogeneous Mixture Comprising the Following Reactants/Amounts was Prepared

Matrix (oil: 5%; $NH_4NO_3$: 85%; $H_2O$: 10%): 139.5 g;
Spherical aluminium (150<particle diameter<500 μm): 60 g;
Sensitizing agent: 0.5 g;
Mixture detonation rate: 4700 m/s.

The explosive mixture was placed in a cartridge of cylindrical geometry and actuated by means of an electrical detonator. The alumina obtained from the reaction between aluminium and oxygen is essentially alumina alpha, it shows a spherical morphology and has a bimodal particle size distribution (Table 3).

The crystallite size is of about 60 nanometers (this value was calculated by means of Scherrer equation and with width values half way from the height determined in the X-Ray diffractogram).

Example 2

In Order to Obtain Titanium Oxide Powder, an Homogeneous Mixture Comprising the Following Reactants/Amounts was Prepared Matrix (oil: 5%; $NH_4NO_3$: 80%; $H_2O$: 15%): 159.5 g;
Grained titanium (100<particle diameter<800 μm): 40 g;
Sensitizing agent: 0.5 g;
Mixture detonation rate: 4800 m/s The explosive mixture was placed in a cartridge of cylindrical geometry and actuated by means of an electrical detonator. The titania synthesized by the detonation process shows mainly the rutile crystalline phase, shows a spherical morphology and has a bimodal particle size distribution (Table 3).

The invention claimed is:

1. A process for the synthesis of nanocrystalline spherical ceramic oxide powder comprising detonating a water-in-oil emulsion comprising oxidant and fuel phases and metals, at a temperature in a C, J (Chapman, Jouguet) point that is higher than the ceramic oxide melting point.

2. The process for the synthesis of ceramic oxides according to claim 1 wherein the water-in-oil emulsion further comprises metal salts dissolved in a composition of the oxidant and fuel phases and the metals.

3. The process for the synthesis of ceramic oxides according to claim 2, wherein the metal and metal salts dissolved in the emulsion are one or more components selected from the group consisting of aluminum, silicon, zirconium, zinc nitrate, nickel nitrate, magnesium nitrate, aluminum sulphate, copper carbonate, titanium chloride and manganese acetate.

4. The process for the synthesis of ceramic oxides according to claim 1, wherein the emulsion has a water content from 3 to 50% (w/w).

5. The process for the synthesis of ceramic oxides according to claim 1, wherein the emulsion has a balance of oxygen from 0 to 400 grams per kilogram of emulsion.

6. The process for the synthesis of ceramic oxides according to claim 1, wherein the oxidant phase of the emulsion has 99.5% purity nitrate solution and in that the fuel phase is from 2 to 30% (w/w) of the emulsion.

\* \* \* \* \*